United States Patent [19]
Michelotti et al.

[11] 3,728,400
[45] Apr. 17, 1973

[54] PROCESS FOR PREPARATION OF POLYMERCAPTANS
[75] Inventors: Francis W. Michelotti; John M. Jordan, both of Easton, Pa.; Neville P. Cook, Ringoes, N.J.
[73] Assignee: J. T. Baker Chemical Company, Phillipsburg, N.J.
[22] Filed: Sept. 17, 1970
[21] Appl. No.: 73,635

[52] U.S. Cl..........260/609 A, 260/47 EC, 260/609 D
[51] Int. Cl......................C07c 149/14, C07c 149/10
[58] Field of Search.......................260/609 A, 609 D

[56] References Cited
UNITED STATES PATENTS
2,404,425   7/1946   Beanblossom et al............260/609 A
1,926,797   9/1933   Sutton..........................260/609 A X OTHER PUBLICATIONS
Martin et al.,"Agnew. Chem. Internat. Ed.", 6, 318, 330–1 (1967)
Kittila, "DMF", 158–9 (1967) QD 305H8K5

Primary Examiner—Lewis Gotts
Assistant Examiner—D. R. Phillips
Attorney—Eugene O. Retter and George W. Rauchfuss

[57] ABSTRACT

Polymercaptans especially suitable as epoxy resin curing agents are produced by reacting a polyhalo compound with sodium sulfhydrate in the presence of dimethyl sulfoxide, dimethylformamide, a dimethylformamide-(lower) alkyl alcohol mixture or a dimethyl sulfoxide-(lower)alkyl alcohol mixture as a solvent for the reaction system.

7 Claims, No Drawings

PROCESS FOR PREPARATION OF POLYMERCAPTANS

This invention relates to a process for the preparation of polymercaptans. More particularly, this invention relates to a proces for the preparation of polymercaptans free of process groups and thus more acceptable as epoxy resin curing agents.

Heretofore, polymercaptans of the general type prepared by this invention have been known and found many valuable uses, such as, for example, as disclosed in U.S. Pat. No. 2,831,896, issued Apr. 22, 1958 to E.D. Holly; U.S. Pat. No. 2,842,582, issued July 8, 1958 to E.L. Jenner and U.S. Pat. No. 2,919,262, issued Dec. 29, 1959 to W.R. Nummy. In addition, it has been known that these polymercaptans may be employed as curing agents or modifiers, either alone or with suitable amines, for epoxy resins to provide air dry coatings and films as disclosed in H. Lee and K. Neville, Epoxy Resins, pp 274, 277, 280, McGraw-Hill Book Co., Inc. (1957). However, these polymercaptans have not been found to be entirely acceptable as curing agents or modifiers due to the fact that these polymercaptans were not free of hydroxyl groups when produced by the heretofore known processes, such as, for example, according to those processes as disclosed in U.S. Pat. No. 2,404,425, issued July 23, 1946 to J.E. Beanblossom and R.H. Kimball; U.S. Pat. No. 2,436,137, issued Feb. 17, 1968 to C.B. Biswell; and U.S. Pat. No. 2,479,542, issued Aug. 16, 1949 to J.C. Patrick. The presence of hydroxyl groups in the polymercaptans have the tendency to kill the curing reaction and thereby adversely affecting the properties of the epoxy coating.

It is, therefore, an object of this invention to provide a process for the preparation of polymercaptans which is devoid of the foregoing problems and disadvantages. Another object of this invention is to provide a process for the production of polymercaptans essentially free of hydroxyl groups. A further object of this invention is to provide a process for the production of essentially hydroxyl-free polymercaptans in high yields. A still further object of this invention is to provide essentially hydroxyl-free polymercaptans suitable as curing and modifying agents for epoxy resins, especially, epoxy resin coatings.

The foregoing objects and others which will become apparent from the following description are accomplished in accordance with this invention, generally speaking, by providing essentially hydroxyl-free polymercaptans by a process wherein polyhalogenated compounds are reacted with sodium sulfhydrate in the presence of dimethyl sulfoxide, dimethylformamide, a dimethylformamide-(lower)alkyl alcohol mixture or a dimethyl sulfoxide-(lower)alkyl alcohol mixture as a solvent. More particularly, high yields of essentially hydroxyl-free polymercaptans, suitable for use as curing agents for epoxy resin coatings, are prepared by the reaction of a polyhalo compound with sodium sulfhydrate at a temperature of from about 25°C. to about 90°C. in the presence of one of dimethyl sulfoxide, dimethylformamide, a dimethylformamide-(lower)alkyl alcohol mixture or a dimethyl sulfoxide-(lower)alkyl alcohol mixture as the solvent for the reaction system.

Any suitable di- or higher polyhalogenated organic compound can be employed in the process of this invention. The halogen atoms present in the suitable compounds may be either chlorine, bromine, iodine or combinations of two or more of said halogens. The halogenated reactant may be any suitable aliphatic, cycloaliphatic or aromatic polyhalogen compound which may be either saturated or unsaturated. The halogen atoms may be present on the main chain or nucleus of the compound or may also be present in halogenated side chains. Most preferably employed as the polyhalogenated compounds are those compounds containing from one to 10 carbon atoms and from two to six halogen atoms, most preferably, chlorine or bromine atoms, in the molecule. Illustrative of the polyhalogenated compounds that may be employed in the process of this invention there may be mentioned, for example, 1,2-bis(2-chloroethoxy) ethane, 1,2,3-trichloropropane, bis(4-chlorobutyl) ether, chloroform, carbon tetrachloride, 1,1,2-trichloroethane, trichloroethylene, 1,1,1-trichloroethane, 1,1,2,2-tetrachloroethylene, 1,1,1,2-tetrachloroethylene, 1,1,1-trichloropropane, 1,2,3-tribromopropane, 1,2,3-triiodopropane, 1,2,4-tribromobutane, 1,2,3,4-tetrabromobutane, 1,2,3,4-tetrachlorobutane, 1,2,3,4-tetraiodobutane, 1,6-dibromo-3,3,4,4-tetrachlorohexane, 1,2,2,3-tetrachloropropane, 1,1,2,2-tetrachloropropane, 1,2,3-trichloro-2-methylpropane, 1,2,3,4-tetrabromobutane, 1,2,3,4-tetrachlorobutane, 1,2,3,4-tetraiodobutane, benzene hexachloride, cyclohexane hexachloride, 1,2,3-trichlorocyclohexane, 1,2-dichloronaphthalene, 4,4'-dichloro diphenylmethane, 4,4'-dibromo diphenylpropane and the like. Mixtures of any two or more of the polyhalo organic compounds may also be employed if desired.

The other reactant in the process of the instant invention is sodium sulfhydrate and it is employed in at least a 1:1 molar ratio with the halogen equivalence of the halogenated organic compound employed as a reactant. Concentration greater than 1:1 are, however, desirable and useful and generally up to about 2 moles of sodium sulfhydrate per mole of halogen in the halogen containing reactant is employed to insure complete reaction.

The process of this invention is carried out in a solvent selected from dimethyl sulfoxide, dimethylformamide, dimethyl sulfoxide-(lower)alkyl alcohol mixture or a dimethylformamide-(lower)alkyl alcohol mixture. Suitable alcohols used in the dimethylformamide- or dimethyl sulfoxide-alcohol mixture include methanol, ethanol, propanol, isopropanol, butanol, isobutanol and tertiary butanol. The solvent system containing alcohol generally contain from about 1 percent to about 50 percent by volume of alcohol in the solvent mixture, preferably around 33 percent by volume of alcohol. The solvent employed in the process of this invention is present in the reaction system in an amount such that the solvent/halogen reactant ratio is from about 1:1 to about 5:1.

The reaction of this invention is conducted at a temperature of from about 25°C. to about 90°C., preferably from about 40°C to about 60°C., and most preferably at about 50°C., for a period of time ranging generally from about 30 to about 120 minutes.

Upon completion of the reaction, the product is recovered in the usual ways, such as, for example, by dilution in water and separation of the oily layer, extracting the water with ether, methylene chloride or ethylene dichloride then combining the ether or alkylene chloride extracts and the oily layer and drying with anhydrous sodium sulfate, calcium chloride or the like, followed by filtration and distillation to remove the ether or methylene chloride.

Illustrative of this invention are the following examples in which the parts and percentages are parts and percentages by weight unless otherwise specified.

EXAMPLE 1 dimercaptan from 1,2-bis(2-chloroethoxy)ethane

Into a 250 ml. 3-neck flask equipped with a stirrer, thermometer and condenser was placed 115.5 g. (1.5 moles) of sodium sulfhydrate and 250 ml. of dimethyl sulfoxide. A slight exotherm occurred when the two were mixed. The milky-white slurry was then heated to 50°C. followed by the addition of 93.5 g. (0.5 mole) of bis (2-chloroethoxy)ethane dropwise over a period of 10 minutes. A mild easily controlled exotherm occurred which lasted for 10 minutes after the addition was completed. The reaction mixture was maintained at 50°C. for 30 minutes after the addition, cooled to 40°C., and poured into 1,600 ml. of water. The bottom oily layer (66.5 g.) was separated from the water and the latter extracted with 300 ml. of ether. The oily layer and ether extracts were combined and dried over anhydrous sodium sulfate. After drying, the mixture was filtered, and the ether removed by distillation; yield of product 87.5 g. (96 percent yield based on bis chloride).

Theoretical elementary analysis for HS—CH$_2$CH$_2$OCH$_2$CH$_2$CH$_2$CH$_2$—SH
   Calculated: S, 35.16% Sh, 36.26% Cl, 0%
   Found: S, 32.28% SH, 27.85% Cl, 0.47%

The infrared spectrum of the product showed strong absorprtion at 3.9μ— characteristic of SH absorption. Since it is likely that exchange occurs between a mercaptan end (RSH) and NaSH as follows:
   A. RSH + NaSH → RSNa + H$_2$S
and RSNa reacts with more chloro compound as follows:
   B. RSNa + R'Cl → RSR' + NaCl the above analytical results are consistent with an approximately 50/50 mixture of
   HS—CH$_2$CH$_2$O—CH$_2$CH$_2$O—CH$_2$CH$_2$—SH and
   HS—CH$_2$CH$_2$OCH$_2$CH$_2$OCH$_2$CH$_2$SCH$_2$CH$_2$O—CH$_2$CH$_2$OCH$_2$CH$_2$c—SH
   (S, 29.1%; SH, 20%)
arising from reactions (A) and (B).
Theoretical elementary analysis for such a mixture is as follows:
S, 32.1%; SH, 28.13%; agreeing well with the results obtained.

EXAMPLE 2 dimercaptan from bis(4-chlorobutyl)ether

A dimercaptan was produced employing the same procedure as described in Example 1 and using 99.5g. (0.5 mole) of bis(4-chlorobutyl)ether and 115.5 g. (1.5 moles) of sodium sulfhydrate in 250 ml. of dimethyl sulfoxide. Essentially a theoretical yield of product was obtained:

Theoretical elemental analysis for HS—(CH$_2$)$_4$O(CH$_2$)$_4$SH.
   Calculated: S, 32.99; SH, 34.03; and Cl, 0%.
   Found: S, 31.45; SH, 27.74; and Cl, 0.23%.

EXAMPLE 3 polymercaptan from 1,2,3-trichloropropane 154 g. of sodium sulfhydrate (2moles) and 300 ml. of dimethyl sulfoxide were placed in a 1-liter 3-neck flask equipped with stirrer, thermometer and condenser. The yellowish-green mixture was heated to 50°C. and 73.7 g. (0.5 mole) of 1,2,3-trichloropropane was added dropwise over a period of 15 minutes. A cooling bath was employed to control the exothermic reaction at 50°C. After the exotherm was over, about 35 minutes after complete addition of chloride, the reaction mixture was cooled to 40°C. and poured into 2 liters of water. A white emulsion-like material separated at the bottom which was removed and combined with four 200 ml. extracts of methylene chloride and dried over anhydrous CaCl$_2$. After drying, the salt was removed by filtration and the methylene chloride distilled off. A light yellow mobile liquid (Brookfield viscosity 90 cps at 25°C.) was obtained in 85 percent yield.

Theoretical analysis for

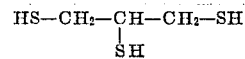

Calculated: S, 68.6; SH, 70.75 and Cl, 0%;
Found: S, 53.5; SH, 44.9%; Cl, 3.52%.

Again mercaptan, sulfhydrate exchange appears to have taken place so that if a 50/50 mixture of products of the following composition is assumed

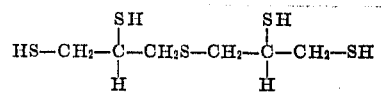

C$_6$H$_{14}$S$_5$: S, 65%; SH, 54%; Cl, 0%

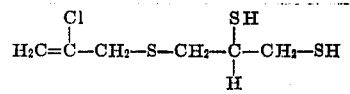

C$_6$H$_{11}$S$_3$Cl: S, 45%; SH, 31%; Cl, 17%
the following average calculated analytical results would be obtained:
   S, 56%; SH, 43%; Cl, 7.8%
which are in agreement with the results obtained above.

EXAMPLE 4 polymercaptan from 1,2,3-trichloropropane

One-hundred fifty-four g. of sodium sulfhydrate (2moles) and 250 ml. of dimethylformamide were placed in a 1-liter 3-neck flask equipped with stirrer, thermometer, and reflux condenser. The yellowish-green mixture was heated to 50°C. and 73.7 g. (0.5 mole) 1,2,3-trichloropropane was added dropwise over a period of about 25 min. A constant temperature of 50°-55C. was maintained during the exothermic reaction by using a wet ice bath around the reaction flask. The reaction mixture was then held at 50°C. for 1 hour after the final addition of 1,2,3-trichloropropane. It was then cooled to about 30°C. To the cooled reaction mixture was added 100 ml. of ethylene dichloride to dissolve the product. The mixture was poured into 600 ml. of water in a separating funnel and mixed. After separation, the heavy phase was removed. A second 600 ml. of water washing was conducted. The heavy phase was then placed in a rotary evaporator and the solvent removed at 75°C. under a pressure of 20 mm Hg. A light yellow mobile liquid was obtained and filtered. Yield was 121.6 g. or 86 percent of theoretical.

The theoretical analysis found was as follows:
% SH = 45.2
% S = 63.7
% Cl = 1.84
% N = 0.1

Example 5 polymercaptan from 1,2,3-trichloropropane

Employing the same reactants as in Example 4 except the solvent was a mixture of 200 ml. of dimethyl formamide and 100 ml. of methanol, instead of 250 ml. of dimethylformamide. The cooled reaction mixture was poured into 600 ml. of water to which was added 200 ml. of ethylene dichloride. The mixture was agitated and allowed to settle into two phases. The extracted product/ethylene dichloride phase was separated and washed again with 600 ml. of fresh water. The heavy phase was placed in a rotary evaporator and the solvent removed under final conditions of 65°C. and 15 mm Hg. A light yellow mobile liquid was obtained and filtered. Yield was about 86 percent of theoretical.

The theoretical analysis found was as follows:
% SH = 42.7
% S = 58
% Cl = 6.98
% N = 0.3

EXAMPLE 6 comparison preparation of a polymercaptan in methanol

One-hundred fifty-four g. sodium sulfhydrate (2 moles) and 300 ml. absolute methanol were placed in a 1-liter 3-neck flask equipped with condenser, stirrer and addition funnel. The mixture was heated to 40°C., followed by the dropwise addition of 73.7 g. 1,2,3,-trichloropropane (0.5 mole) at 40°C. over a period of 20 minutes. No exotherm developed. The mixture was then heated to 70°C., and held at this temperature for 6 hours. The reaction mixture was poured into 2 liters of water. A white precipitate formed which was separated from the water layer. The latter layer was extracted 5 times with 200 ml. of methylene chloride and the organic layers combined with the white precipitate. The combined extracts and precipitate were dried with calcium chloride, filtered and the methylene chloride removed by distillation. A 31 percent yield of a yellow viscous product was obtained with the following analysis:

% S, 46.87%; % SH, 7.80%; % Cl, 9.6%

It is thus apparent that the use of methanol instead of the solvents of this invention in the above synthesis results in a viscous product with very low SH value (7.80 percent) as compared to an SH value of 45–50 percent when dimethyl sulfoxide is employed.

The polymercaptans produced according to the process of this invention are suitable for use as curing agents for epoxy resins either with or without a curing accelerator. Epoxy resins cured with polymercaptans produced in accordance with this invention are characterized by good lap shear strengths. Generally from about 0.9 to 1.0 stoichiometric equivalents of a polymercaptan per equivalent of epoxy resin is employed. Where a cure accelerator is desired it is generally employed in an amount of from about 1 to about 10 parts per 100 parts of epoxy resin. Illustrative of the advantage to be obtained by curing epoxy resins with a polymercaptan produced in accordance with this invention is the good lap shear strength of about 1,050 psi of a EPON 828 (epoxy resin of epichlorohydrin and 4,4'-dihydroxy diphenylpropane and having an epoxide equivalent of 175 to 210 and being of average molecular weight of 350 to 400) cured with 0.9 equivalents of a polymercaptan prepared according to Example 3 in the presence of 1 part 2,4,6-tri(dimethylaminomethyl) phenol per 100 parts epoxy resin as a curing accelerator. The lap shear strength was determined by bonding together two 1 inch wide aluminum strips, using a ½ inch overlap and pulling the assembly apart in tensile shear after curing at room temperature for 24 hours. The surfaces of the two strips were cleaned, coated with the epoxy formulation and placed together for curing with the actual testing being done in accordance with ASTM procedure D–1002.

What is claimed is:

1. In a process for producing polymercaptans comprising reacting a polyhalo organic compound with sodium sulfhydrate, the improvement comprising conducting the reaction at a temperature of from about 25°C. to about 90°C. in the presence of a solvent selected from dimethyl sulfoxide, dimethylformamide, a dimethylformamide-(lower)alkyl alcohol mixture or a dimethyl sulfoxide-(lower)alkyl alcohol mixture wherein the sodium sulfhydrate is present in the reaction system in an amount such that the molar ratio of sodium sulfhydrate to halogen equivalence of the polyhalo organic compound is from 1:1 to about 2:1 and the solvent is employed in an amount such that the solvent/polyhalo organic reactant ratio is from about 1:1 to about 5:1 and when the solvent is one of the mixtures the amount of the (lower)alkyl alcohol present in the solvent mixture is from about 1% to about 50% by volume of the solvent mixture.

2. The process of claim 1 wherein the polyhalo organic compound reactant is a compound containing from two to six halogen atoms in the compound and the halogen atoms are selected from chlorine and bromine atoms.

3. The process of claim 2 wherein the polyhalo organic compound reactant contains from one to 10 carbon atoms in the molecule.

4. The process of claim 3 wherein the polyhalo organic reactant is selected from 1,2,3-trichloropropane, 1,2-bis(2-chloroethoxy) ethane and bis(4-chlorobutyl)ether.

5. The process of claim 1 wherein the solvent employed is dimethyl sulfoxide.

6. The process of claim 1 wherein the solvent employed is dimethylformamide.

7. The process of claim 1 wherein the solvent employed is a 2:1 dimethylformamide-methanol mixture.

* * * * *

UNITED STATES PATENT AND TRADEMARK OFFICE
CERTIFICATE OF CORRECTION

PATENT NO. : 3,728,400
DATED : April 17, 1973
INVENTOR(S) : Francis W. Michelotti, John M. Jordan and Neville P. Cook It is certified that error appears in the above-identified patent and that said Letters Patent are hereby corrected as shown below:

Column 1, line 7, "free of process groups" should read "free of hydroxyl groups". Column 3, lines 36-37, "HS-$CH_2CH_2OCH_2CH_2CH_2CH_2$-SH" should read "HS-$CH_2CH_2OCH_2$-$CH_2OCH_2CH_2$-SH"; line 52, -$CH_2CH_2OCH_2CH_2$c-SH" should read "-$CH_2CH_2OCH_2CH_2$-SH"

Signed and Sealed this

Twenty-second Day of November 1977

[SEAL]

Attest:

RUTH C. MASON
Attesting Officer

LUTRELLE F. PARKER
Acting Commissioner of Patents and Trademarks